Aug. 23, 1966 H. W. NEIDHARDT ET AL 3,268,024
VEHICLE STEERING SYSTEM
Filed Feb. 13, 1964 3 Sheets-Sheet 1

INVENTORS:
HEINZ WERNER NEIDHARDT
GERHARD HAUSKE

By: Mestern, Ross & Mestern

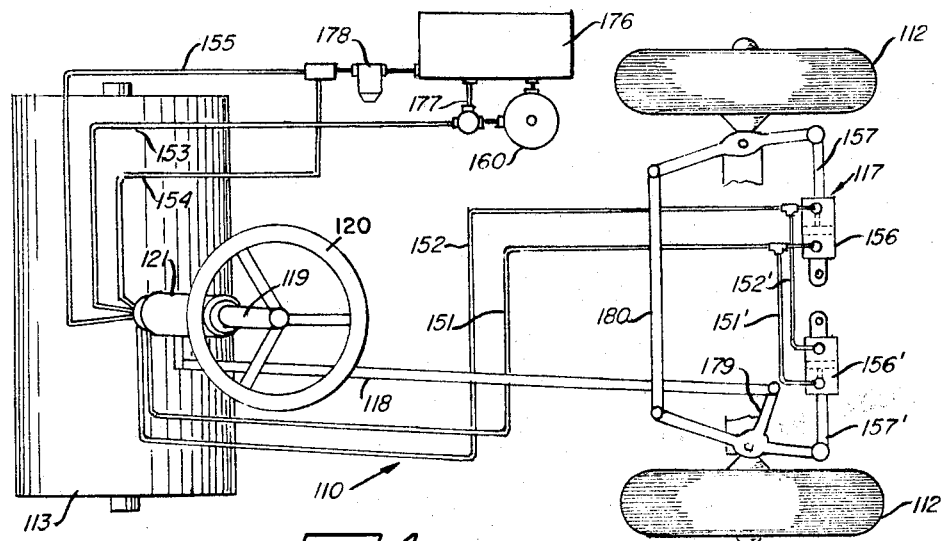
Fig. 4
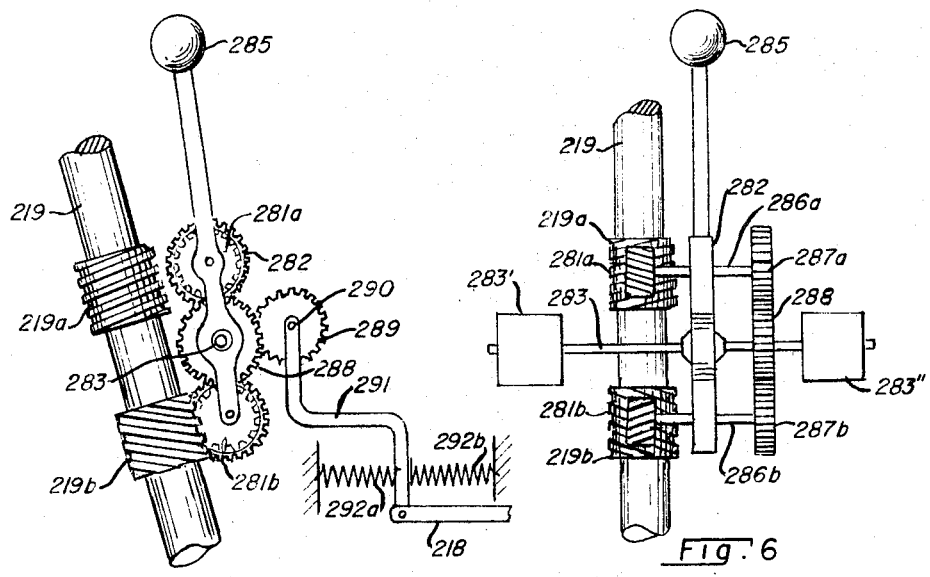
Fig. 5
Fig. 6
INVENTOR.
HEINZ WERNER NEIDHARDT
GERHARD HAUSKE
By: Mestern, Ross & Mestern

United States Patent Office 3,268,024
Patented August 23, 1966

3,268,024
VEHICLE STEERING SYSTEM
Heinz Werner Neidhardt, Limburg an der Lahn, and Gerhard Hauske, Diez (Lahn), Germany, assignors to Scheid Maschinenfabrik G.m.b.H., Limburg an der Lahn, Germany
Filed Feb. 13, 1964, Ser. No. 344,786
11 Claims. (Cl. 180—20)

Our present invention relates to self-propelled vehicles, particularly those of the road-working type.

Steamrollers and similar road-working vehicles have heretofore been designed, in general, only for limited locomotion at the construction site, their transport to and from the site having usually been effected by special carrier. A more recent development, as disclosed in our U.S. Patent No. 3,119,313 issued January 28, 1963, is a ground-compacting machine with steerable wheels adapted to act both as road rollers and as transport wheels.

When a self-propelled machine of this type is driven along a highway, steering poses certain difficulties since the restoring mechanism usually provided on automotive vehicles, for the purpose of tending to center their dirigible wheel assemblies, is lacking inasmuch as its presence would interfere with the operation of the machine at the construction site. The general object of our present invention is to avoid this inconvenience.

A related object of this invention is to provide a self-propelled machine of the type described which can be driven at relatively high speeds, in the manner of conventional automotive vehicles, from one construction site to another.

The invention realizes these objects, in a self-propelled vehicle provided with rolling chassis-supporting means including one or more drum-type or wheel-type road rollers, by the provision of a transmission system between a steering column and the dirigible part of the wheel-and-roller assembly, this transmission system including restoring means tending to center the assembly and driver-actuated control means for substantially deactivating, i.e. completely disabling or at least greatly throttling, the aforementioned restoring means.

The transmission system as also the associated restoring means may basically consist of mechanical, hydraulic, pneumatic or electric elements know per se, or combinations thereof. The control means designed to throttle or disable the restoring means may include a hand-operated special lever although, in accordance with a more specific feature of our invention, use may also be made of an otherwise conventional gear-shift mechanism for rendering the restoring means effective whenever the vehicle is shifted into one of its higher gears, the centering action thus being eliminated at low speeds corresponding to those employed in road-working operations. The driver, of course, will always be in full control of the yawing motion of the vehicle, whether the same moves slowly without automatic centering action or more rapidly with such action.

The invention thus enables the use, in a road-working vehicle, of a steerable wheel assembly (e.g. at the front end) with wheels suitably toed in and cambered to hold the road during straightforward motion, the restoring force derived from this positioning of the steering wheels being of course supplementable by additional biasing devices such as, for example, one or more centering springs.

In the specific case in which the restoring force is transmitted by way of a hydraulic or pneumatic line, the invention contemplates cutting off or throttling the passage of fluid through that line whenever suppression of the centering action is desired. In a purely mechanical system, on the other hand, the shift from centering to non-centering operation and vice versa may be effected by the alternate use of a reversible and a nonreversible linkage, e.g. a pair of driving worms of respectively blocking and nonblocking pitch angle.

The above and other objects, features and advantages of our invention will become apparent from the following detailed description of certain embodiments, reference being made to the accompanying drawing in which:

FIG. 4 is a top plan view of the steering mechanism of a modified vehicle according to the invention;

FIG. 5 is a fragmentary side-elevational view of another system for the transmission of a steering force in accordance with our invention; and FIG. 6 is a front-elevational view taken on line VI—VI of FIG. 5.

Figure 1:
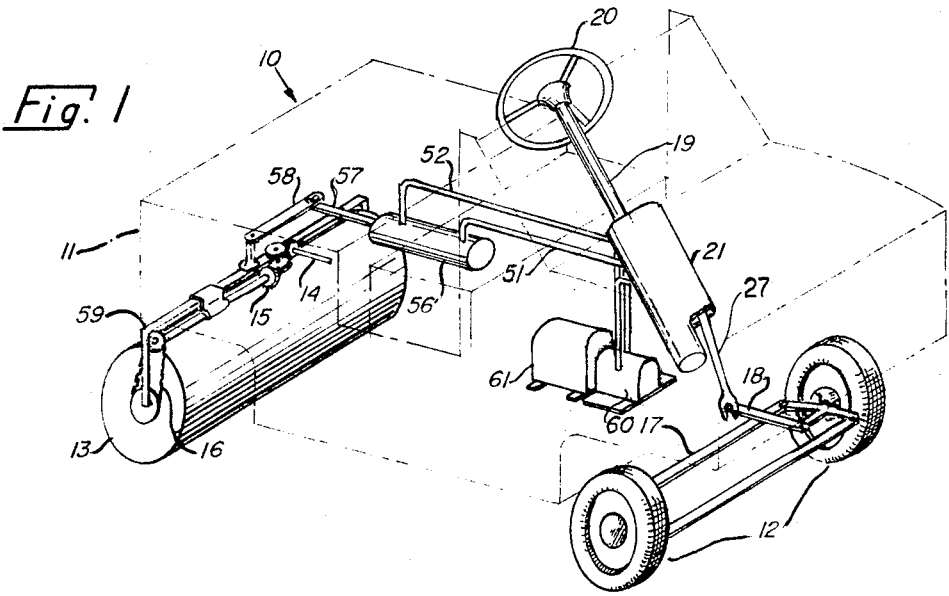
FIG. 1 is a perspective view of the chassis, the wheel-and-roller assembly and the steering column of a vehicle embodying the invention.

The vehicle 10 shown in FIG. 1 comprises a chassis 11 supported by a pair of conventional cambered and toed-in front wheels 12 and a rear roller 13, the latter being driven by an engine (not shown) via a power shaft 14, bevel gears 15 and a chain 16.

Figure 2:
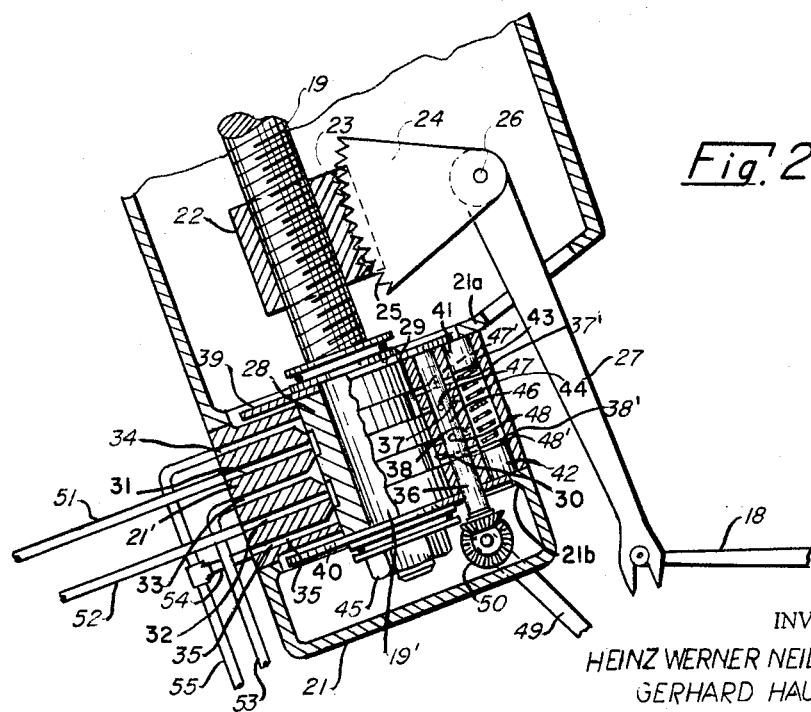
FIG. 2 is a fragmentary sectional view of the steering-column assembly shown in FIG. 1.

The dirigible front end 17 of the vehicle, to which the wheels 12 are attached, includes a link 18 by which yawing motion may be imparted to the wheels under the control of a steering column 19 and a steering wheel 20 adjacent the driver's seat. Steering column 19 is journaled in a housing 21 and, as best seen in FIG. 2, terminates at its lower end in a threaded extremity matingly received in a nut 22, the latter being nonrotatable but axially slidable in housing 21. A set of rack teeth 23 in a lateral groove of nut 22, straddling a sector gear 24, mesh with the teeth 25 of that sector gear which is swingable about a stud 26 and rigid with an arm 27 articulated to the link 18.

The downward extension 19' of column 19 traverses a sleeve 28 which acts as a valve body and, to this end, is provided with a pair of peripheral grooves 29, 30 respectively registering, in the illustrated central axial position of the column, with two radial channels 31, 32 in an internal boss 21' of housing 21; boss 21' also contains three further such channels, i.e. a central channel 33 and two outer channels 34, 35. On the side diametrically opposite the channels 31–35, boss 21' is provided with a bore 36 parallel to the column axis and with two transverse passages 37, 38 normally aligned with grooves 29 and 30, respectively. A pair of flanges 39, 40 are transversely disposed at opposite ends of sleeve 28 and project beyond the bore 36 to overlie a pair of cylindrical plungers 41, 42 in an axially extending cylindrical chamber 43 of boss 21', this chamber normally communicating with the passages 37, 38 and containing a compression spring 44 tending to force the plungers 41, 42 apart and against fixed abutments 21a, 21b in housing 21. Since the axial length of sleeve 28 slightly exceeds that of boss 21', flanges 39, 40 permit a limited axial displacement of column 19 together with sleeve 28 which is secured to its extension 19' by a nut 45.

Bore 36 is occupied by a cylindrical valve member 46 provided with transverse orifices 47, 48 in line with passages 37, 38 so as to establish communication between the grooves 29, 30 and the spring chamber 43 when the member 46 is rotated into a position in which the orifices 47, 48 and the passages 37, 38 are mutually aligned. In the position actually illustrated in FIG. 2, the orifices 47, 48 stand at right angles to the passages 37, 38 so as to block the flow of fluid therethrough. At the same time, however, two further orifices 47', 48' in member 46 communicate with other transverse passages 37', 47' in boss 21'. Valve member 46 is coupled with a lever 49 via a pair of bevel gears 50.

The channels 31–35 respectively communicate with a set of hydraulic conduits 51–55. Conduits 51, 52 lead to opposite ends of a hydraulic cylinder 56. A piston 57, projecting from cylinder 56, is linked to a crank 58 which is rigid with a frame 59 supporting the roller 13 for limited angular displacement in a horizontal plane.

The outer conduits 54, 55, merging into a single line, and the central conduit 53 lead to the intake and discharge ports, respectively, of a fluid pump 60 driven by a motor 61. In the centered position of sleeve 28 shown in FIG. 2, into which the sleeve is urged by the spring 44, the hydraulic fluid from high-pressure line 53 is evenly divided between outgoing conduits 51, 52 so that piston 57 and, therefore, roller 13 are held in their centererd position; since, however, the force of the spring 44 is relatively weak, this centering action is very slight. With valve member 46 in its illustrated position, the hydraulic cylinder constituted by chamber 43 is vented to the low-pressure side of fluid source 60, 61 via passages 37', 38' and orifices 47', 48'.

Let us assume, now, that the driver turns the steering wheel 20 to the right so that the nut 22, held against rotation about the axis of column 19, is lifted by this column and causes a clockwise swing of segment 24 and arm 27 as viewed in FIG. 2. Link 18, forming part of the steering mechanism for the front-wheel assembly 17, now swings that assembly to the right, to the extent that such motion is not impeded by the ground friction as will usually be the case when the vehicle is stationary or in slow motion. When this frictional resistance takes effect and arrests the swing of segment 24, nut 22 becomes fixed and causes the spindle 19 with sleeve 28 to move axially against the restoring force of spring 44, this motion being downward in the situation referred to. Grooves 29, 30 of sleeve 28 now cut off the high-pressure conduit 53 from line 52 and connect it fully to line 51, thus applying fluid pressure to the forward end of cylinder 56 and rotating the roller 13 into a position consistent with the intended rightward yawing of the vehicle.

The operation of the system shown in FIGS. 1 and 2 will now be described on the assumption that lever 49, which controls the position of valve member 46, is within direct reach of the driver or is operable by him in some other convenient manner, e.g. via a gear-shifting mechanism as more fully described hereinafter with reference to FIG. 3. In the illustrated position of that lever, with member 46 blocking the influx of high-pressure fluid from channel 33 into chamber 43 which moreover is vented in the aforementioned manner through orifices 47', 48' (and in view of the almost negligible centering force exerted by the spring 44), the plungers 41, 42 are virtually free-floating in their chamber 43 so that no effective restoring action will take place and roller 13 as well as front wheel 12 will remain in their yawing position. Positive action by the driver is, therefore, required to reorient the rolling supports 12, 13 of the vehicle body for changing its direction of locomotion.

If, however, lever 49 is swung about to rotate the valve member 46 through 90°, chamber 43 is placed in communication with the high-pressure side of the hydraulic system by way of groove 29 as soon as the descent of column 19 and sleeve 28 has cut off groove 30 from passage 38. The resulting fluid pressure in chamber 43, supplementing the force of spring 44, now bears upon the plunger 41 and, through it, upon the flange 39 in an upward direction, thus tending to restore the system to neutral. In an analogous manner, fluid pressure is exerted upon the plunger 42 when the column 19 and cylinder 28 are lifted from their illustrated neutral position upon a leftward steering of the wheel. It should be noted that the threads of column 19 and nut 22 are of relatively large pitch angle, greater than their angle of friction, so that this column with steering wheel 20 may turn freely and the restoring motion will not be impeded even if sector 24 remains blocked.

Figure 3:
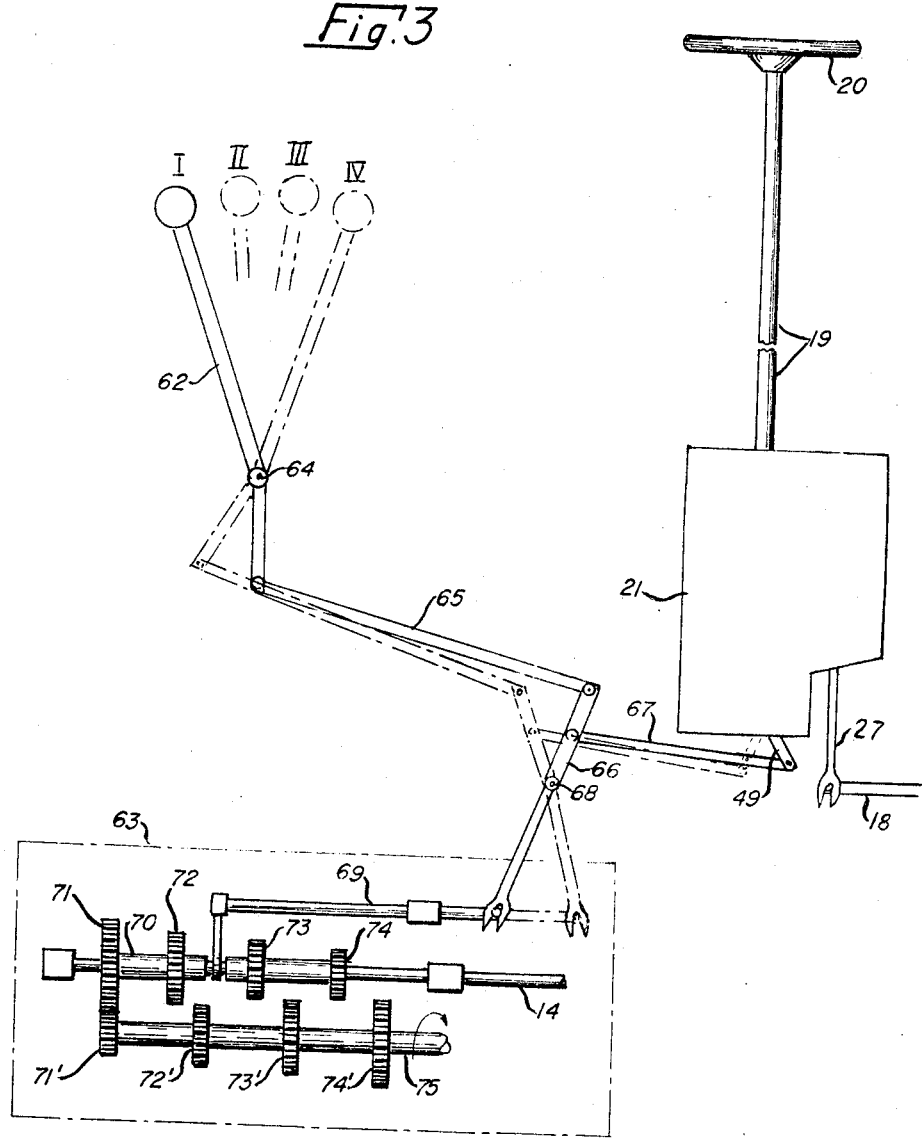
FIG. 3 shows, somewhat diagrammatically, a speed-changing system operatively linked with the assembly of FIG. 2.

Reference will now be made to FIG. 3 for a description of an advantageous control system designed to make the position of lever 49, and therefore that of valve member 46, dependent upon the operation of a shift lever 62 associated with a speed-changing mechanism here shown as a gear box 63. Lever 62 is assumed to have four distinct forward positions respectively designated I, II, III and IV, the low-speed position I having been illustrated in full lines whereas the high-speed position IV is shown in dot-dash lines. Lever 62, fulcrumed at 64 to the chassis of the vehicle, is articulated to a link 65 which in turn is hinged to an arm 66 coupled via a link 67 with lever 49. Arm 66, fulcrumed at 68, engages a gear-shifting fork 69 in box 63, the prongs of this fork straddling a sleeve 70 on the output shaft 14 (cf. FIG. 1). Sleeve 70 bears four gears 71, 72, 73, 74 of progressively decreasing size, positioned for co-operation with respective gears 71', 72', 73', 74' of progressively increasing diameter keyed to an input shaft 75 which is driven from the engine (not shown) of the vehicle. It will be apparent that gears 71, 72, 73 and 74 mesh with their counterparts 71', 72', 73', and 74' in positions I, II, III and IV, respectively.

Owing to the provision of link 67, lever 49 will also be progressively displaced upon a shifting from position I into positions II, III and IV, the passages 37, 38 and 37', 38' in housing boss 21' and the orifices 47, 48 and 47', 48' in valve member 46 being so dimensioned and relatively oriented that the plungers 41, 42 are subjected to fluid pressure, in the aforedescribed manner, only in positions III and IV but are floating in positions I and II.

It will be understood that the speed changer 63 shown in FIG. 3 is representative of a variety of such devices, with any number of speeds or gears, and that in each case the centering mechanism of the steering assembly can be made effective in some but not all of these positions.

In FIG. 4 we have shown, somewhat diagrammatically, the steering mechanism of a modified vehicle 110 provided with a dirigible rear-wheel assembly 117, generally similar to front wheel assembly 17 of FIG. 1, and with a road roller 113 journaled in fixed bearings at the front of the wheel. The vehicle engine, not shown, may drive the rear wheels 112 and/or the front roller 113.

The dirigible part of the rolling elements 112, 113 supporting the vehicle body, here the rear-wheel assembly 117, is controlled by a steering wheel 120 on a column 119 which is journaled in a housing 121, the construction of the housing being assumed to be substantially identical with that of housing 21 in the preceding embodiment. Hydraulic lines 151, 152 lead from the housing 121 to opposite ends of a working cylinder 156, a similar cylinder 156' being connected to these lines in like manner via branch lines 151', 152'. The pistons 157, 157' of cylinders 156, 156' are interconnected by an articulated linkage 180 which is joined to the axles of wheels 112 in the usual manner to impart yawing motion thereto. A rod 118, corresponding to link 18 of FIGS. 1–3, is hinged to an arm 179 rigid with linkage 180. Other hydraulic lines 153–155 extend from the housing 121, line 153 leading to the high-pressure side of a fluid pump 160 whereas lines 154 and 155 merge into a single conduit which contains a shut-off valve 178 and terminates at a sump 176 on the low-pressure side of pump 160.

In the operation of the system shown in FIG. 4, yawing motion is imparted to the wheels 112 upon suitable rotation of the steering wheel 120, first mechanically and then, if friction becomes excessive, hydraulically via pistons 157, 157' as more fully described hereinabove.

In FIGS. 5 and 6 we have shown a further modification wherein a steering column 219 is provided with two worms 219a and 219b adapted to mesh with worm gears 281a, 281b, respectively, on a common support 282 pivotally mounted on a shaft 283 which is journaled in stationary bearings 283', 283''. Support 282 terminates in a handle 285 by which it may be swung into either of two operative positions for engagement of one or the other worm 219a, 219b with the corresponding gear 281a, 281b. These gears are keyed to shafts 286a, 286b together with pinions 287a, 287b which mesh with a common gear 288; the latter, in turn, engages a gear 289 whose shaft 290 is rigid with a lever 291 having a link 218 articulated thereto. It will be understood that link 218 has the same function as members 18, 118 of the preceding embodiments, i.e. that of controlling a power-assisted steering mechanism of the type illustrated in FIG. 2.

It will be noted that worms 219a, 219b have opposite pitch angles so that rotation of column 219 in a given direction will rotate the gears 288, 289 in the same sense, irrespectively of which of the two worm gears 281a, 281b is engaged. A pair of springs 292a, 292b bias the linkage 291, 218 toward a neutral position in which the associated dirigible wheel assembly (at the front or rear end of the vehicle) is centered for straightline travel. Furthermore, the pitch angle of the threads of worm 219a is relatively small, i.e. less than the angle of friction, so that the springs 292a, 292b will remain ineffectual when the gear 218a is engaged by this worm; thus worm 219a and gear 281a together constitute a unidirectional linkage or nonreversing drive for the transmission mechanism 291, 218. Worm 219b, on the other hand, has a relatively large pitch angle (exceeding the angle of friction) so that the transmission of torques therethrough may be effected in both directions, i.e. to and from the steering column, the springs 292a, 292b being therefore able to center the steering wheel and the dirigible wheel assembly of the vehicle when the worm 219b is engaged by the gear 281b as shown in FIG. 5. Again, the particular mechanism illustrated in FIGS. 5 and 6 is merely representative of a variety of different systems for shifting from a reversible to a nonreversible linkage, and vice versa, between a steering column and a dirigible wheel assembly.

It will, of course, be apparent that the handle 285 of FIGS. 5 and 6 may be controlled either directly by the driver or through the intermediary of a gear-shift mechanism as described above with reference to FIG. 3 and lever 49.

Other modifications of the embodiments specifically shown and described will, of course, be apparent to persons skilled in the art and are intended to be embraced by the spirit and scope of the invention as defined in the appended claims.

We claim:

1. In a self-propelled vehicle, in combination, a chassis, rolling support means for said chassis including a steerable wheel assembly, driver-operable steering means on said chassis, transmission means operatively linking said steering means with said wheel assembly, restoring means coupled with said transmission mean for tending to maintain said wheel assembly in a centered position, and driver-actuatable control means connected with said restoring means for substantially deactivating the latter, said transmission means including a member coupled with said restoring means and further including a reversible and a nonreversible linkage alternately insertable between said steering means and said member, said reversible linkage being adapted to transmit a reaction force from said restoring means to said steering means, said control means including mechanism for substituting said nonreversible linkage for said reversible linkage whereby said reaction force is blocked.

2. The combination defined in claim 1 wherein said reversible and nonreversible linkages include worm gears of different pitch.

3. In a self-propelled vehicle, in combination, a chassis, rolling support means for said chassis including a steerable wheel assembly, driver-operable steering means on said chassis, transmission means operatively linking said steering means with said wheel assembly, restoring means including a fluid line coupled with said transmission means for tending to maintain said wheel assembly in a centered position, auxiliary power-steering means independent of said restoring means for controlling said wheel assembly in response to displacement of said transmission means by said steering means, and driver-actuatable control means connected with said restoring means for substantially deactivating the latter by obstructing said fluid line.

4. In a self-propelled vehicle, in combination, a chassis, rolling support means for said chassis including a steerable wheel assembly, driver-operable steering means on said chassis, transmission means operatively linking said steering means with said wheel assembly, drive means for at least part of said support means including speed-changing means provided with a low-speed and a high-speed position, restoring means including a fluid line coupled with said transmission means for tending to maintain said wheel assembly in a centered position, auxiliary power-steering means independent of said restoring means for controlling said wheel assembly in response to displacement of said transmission means by said steering means, and control means connected with said restoring means and responsive to said speed-changing means for substantially deactivating the latter in said low-speed position by obstructing said fluid line.

5. In a self-propelled vehicle, in combination, a chassis, rolling support means for said chassis including a dirigible part provided with a steering mechanism, said support means including a road roller, drive-operable steering means on said chassis, transmission means operatively linking said steering means with said steering mechanism, restoring means including a fluid line coupled with said transmission means for tending to maintain said support means in a centered position, said steering mechanism including auxiliary power-steering means independent of said restoring means for controlling said dirigible part in response to displacement of said transmission means by said steering means, and driver-actuatable control means connected with said restoring means for substantially deactivating the latter by obstructing said fluid line.

6. In a self-propelled road-working vehicle, in combination, a chassis, rolling support means for said chassis including a dirigible part provided with a steering mechanism, said support means including a road roller, driver-operable steering means on said chassis, transmission means operatively linking said steering means with said steering mechanism, restoring means including a fluid line coupled with said transmission means for tending to maintain said support means in a centered position, and driver-actuatable control means connected with said restoring means for substantially deactivating the latter by obstructing said fluid line, said steering means comprising a threaded steering column, a housing, a valve body rigid with said column received in said housing with freedom of limited axial displacement, and a nonrotatable nut matingly engaging said steering column, said transmission means including a mechanical linkage coupled with said nut and a source of hydraulic fluid controlled by said valve body for becoming effective only in response to an axial shifting of said column upon a blocking of said linkage by excess frictional resistance, said restoring means including a fluid chamber connected by a passage with said source and plunger means in said chamber coupled with said column for urging it into a neutral axial position, said control means comprising flow-obstructing means in said passage.

7. The combination defined in claim 6 wherein said flow-obstructing means comprises a rotatable valve member traversing said passage.

8. The combination defined in claim 6 wherein said chamber extends parallel to the axis of said column and has two open ends, said plunger means including a pair of plungers respectively projecting from said ends, said sleeve being provided with two radially projecting flanges respectively bearing upon said plungers.

9. The combination defined in claim 8, further comprising spring means in said chamber tending to keep said plungers apart.

10. The combination defined in claim 8 wherein said housing is provided with a pair of axially spaced abutments respectively engageable by said plungers in said neutral position of said column.

11. In a self-propelled vehicle, in combination, a chassis, rolling support means for said chassis including a dirigible part provided with a steering mechanism, said support means including a road roller, driver operable steering means on said chassis, transmission means operatively linking said steering means with said steering mechanism, drive means for at least part of said support means including speed-changing means provided with a low-speed and a high-speed position, restoring means including a fluid line coupled with said transmission means for tending to maintain said support means in a centered position, said steering mechanism including auxiliary power-steering means independent of said restoring means for controlling said dirigible part in response to displacement of said transmission means by said steering means, and control means connected with said restoring means and responsive to said speed-changing means for substantially deactivating the latter in said low-speed position by obstrucing said fluid line.

References Cited by the Examiner
UNITED STATES PATENTS

| | | | |
|---|---|---|---|
| 1,639,284 | 8/1927 | Bragg et al. | 180—79.2 |
| 2,063,920 | 12/1936 | Friestedt | 280—89 |
| 2,356,492 | 8/1944 | Smith | 180—79.2 |
| 2,954,088 | 9/1960 | Williamson et al. | 180—79.2 |
| 2,996,136 | 8/1961 | Nallinger et al. | 180—79.2 |

BENJAMIN HERSH, *Primary Examiner.*

J. A. PEKAR, *Assistant Examiner.*